(12) United States Patent
Moshe et al.

(10) Patent No.: US 12,045,506 B2
(45) Date of Patent: Jul. 23, 2024

(54) COMBINING OPERATIONS DURING RESET

(71) Applicant: Western Digital Technologies, Inc., San Jose, CA (US)

(72) Inventors: Eran Moshe, Kfar Saba, IL (US); Shir Pinhas, Beer Sheva (IL)

(73) Assignee: Sandisk Technologies, Inc., Austin, TX (US)

( * ) Notice: Subject to any disclaimer, the term of this patent is extended or adjusted under 35 U.S.C. 154(b) by 344 days.

(21) Appl. No.: 17/654,979

(22) Filed: Mar. 15, 2022

(65) Prior Publication Data

US 2023/0297277 A1    Sep. 21, 2023

(51) Int. Cl.
     *G06F 3/06*          (2006.01)

(52) U.S. Cl.
     CPC .......... *G06F 3/0659* (2013.01); *G06F 3/0604* (2013.01); *G06F 3/0652* (2013.01); *G06F 3/0679* (2013.01)

(58) Field of Classification Search
     CPC .... G06F 3/0604; G06F 3/0652; G06F 3/0659; G06F 3/0679; G06F 3/061; G06F 3/0632; G06F 3/0656
     See application file for complete search history.

(56) References Cited

U.S. PATENT DOCUMENTS

| | | | |
|---|---|---|---|
| 10,539,989 B1 | 1/2020 | Pedersen et al. | |
| 11,113,073 B2 | 9/2021 | Blodgett | |
| 11,157,439 B2 | 10/2021 | Hahn et al. | |
| 2017/0031830 A1* | 2/2017 | Bk | G06F 3/0604 |
| 2020/0050505 A1 | 2/2020 | Guo et al. | |
| 2021/0109765 A1 | 4/2021 | Benisty | |

\* cited by examiner

*Primary Examiner* — Jane W Benner
(74) *Attorney, Agent, or Firm* — PATTERSON + SHERIDAN, LLP

(57) ABSTRACT

Reset operations impact data storage device latency. Every reset operation involves flushing cache data to the memory device and resetting the front end application specific integrated circuit (ASIC) accelerator/host interface module (HIM). Multiple resets that are performed consecutively waste valuable data storage device resources due to the duplication of the operations that every reset operation performs. Data storage device latency can be improved, as can data storage device idle time, by combining reset operations and removing duplicative operations. For example, for two different, but consecutive reset operations, the reset operations are performed by flushing the cache data and resetting the ASIC accelerator/HIM only once rather than repeat the operations for each reset operation. In so doing, the two reset operations complete reset operations faster than would otherwise occur.

20 Claims, 5 Drawing Sheets

COMBINING OPERATIONS DURING RESET

BACKGROUND OF THE DISCLOSURE

Field of the Disclosure

Embodiments of the present disclosure generally relate to efficient operation of a data storage device.

Description of the Related Art

A data storage device typically functions as the storage device for a host device coupled thereto. The host device communicates with the data storage device via commands such as read commands to read data from the data storage device or write commands to write data to the data storage device for storage purposes. The data storage device includes a controller that controls operations of the data storage device as well as a memory device that stores the data. Upon receipt of a command from the host device, the controller communicates with the memory device to process the command.

During the data storage device operational and nonoperational states, the data storage device may be requested by the host device to perform resets. The resets are translated to internal operations that take time and are required to perform complicated operations such as application specific integrated circuit (ASIC) resets, initializations and flushing cache data to the memory device. The preparations and operations for handling resets increase latency time for handling input/output (I/O) commands and decrease data storage device idle time (i.e., background time) which is used to perform other important operations such as wear leveling, which helps improve the data storage device reliability.

Therefore, there is a need in the art for improving latency and idle time during resets.

SUMMARY OF THE DISCLOSURE

Reset operations impact data storage device latency. Every reset operation involves flushing cache data to the memory device and resetting the front end application specific integrated circuit (ASIC) accelerator/host interface module (HIM). Multiple resets that are performed consecutively waste valuable data storage device resources due to the duplication of the operations that every reset operation performs. Data storage device latency can be improved, as can data storage device idle time, by combining reset operations and removing duplicative operations. For example, for two different, but consecutive reset operations, the reset operations are performed by flushing the cache data and resetting the ASIC accelerator/HIM only once rather than repeat the operations for each reset operation. In so doing, the two reset operations complete reset operations faster than would otherwise occur.

In one embodiment, a data storage device comprises: a memory device; and a controller coupled to the memory device, wherein the controller is configured to: receive a first reset request; process all operations of the first reset request; receive a second reset request; and complete less than all operations of the second reset request, wherein uncompleted operations of the second reset request are duplicates of operations of the first reset request.

In another embodiment, a data storage device comprises: a memory device; and a controller coupled to the memory device, wherein the controller is configured to: receive a first reset request and a second reset request, wherein the first reset request includes at least a first operation that is identical to a first operation of the second reset request, wherein the first reset request and the second reset request each include at least a second operation; perform the first operation of only one reset request of the first reset request and the second reset request; and perform the second operation for each of the first reset request and the second reset request.

In another embodiment, a data storage device comprises: memory means; a controller coupled to the memory means, wherein the controller is configured to: determine whether any data has been cached since a previous reset operation; and upon determining that no data has been cached since the previous reset operation, skip any operations of a new reset request that were performed in the previous reset request.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

Reset operations impact data storage device latency. Every reset operation involves flushing cache data to the memory device and resetting the front end application specific integrated circuit (ASIC) accelerator/host interface module (HIM). Multiple resets that are performed consecutively waste valuable data storage device resources due to the duplication of the operations that every reset operation performs. Data storage device latency can be improved, as can data storage device idle time, by combining reset operations and removing duplicative operations. For example, for two different, but consecutive reset operations, the reset operations are performed by flushing the cache data and resetting the ASIC accelerator/HIM only once rather than repeat the operations for each reset operation. In so doing, the two reset operations complete reset operations faster than would otherwise occur.

Figure 1:
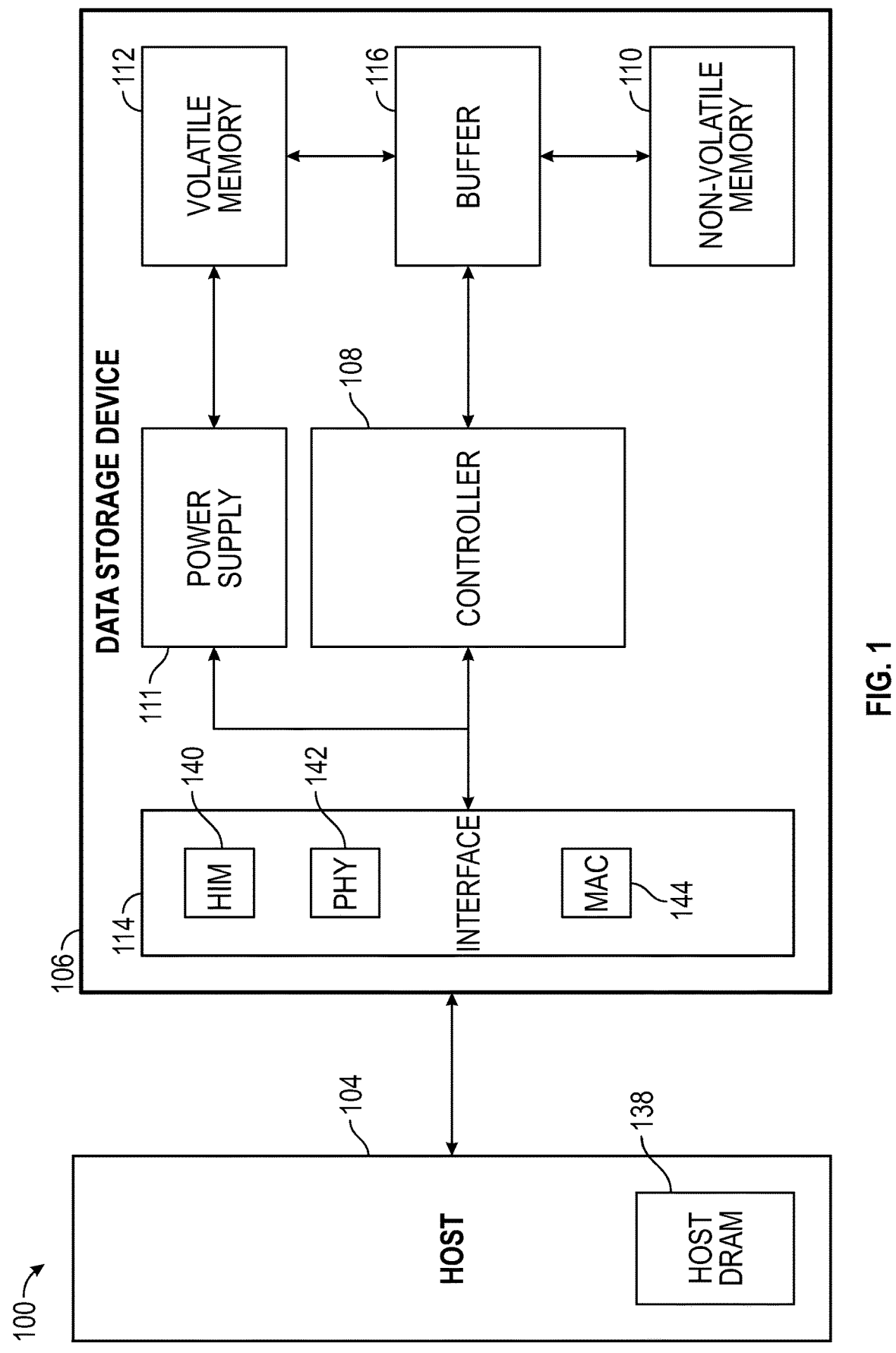
FIG. 1 depicts a schematic block diagram illustrating a storage system in which a data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114. The interface 114 includes a host interface module (HIM) 140, at least one phy 142, and a multiply-accumulate (MAC) module 144.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Data storage devices often perform background operations during idle time as the data storage device is, during idle time, not processing commands issued by the host device. Data storage device idle time can be improved or increased by combining internal reset operations. Furthermore, combining internal reset operations reduces latency because the data storage device is not wasting time performing duplicate operations.

Reset requests that have overlapping operations during the resets can be combined. For example, when the host device requests any reset, the data storage device should perform the following operations: flush cache data to the memory device; and front end (FE) ASIC accelerator/host interface module (HIM) reset. The two reset operations are the basic resets performed in a controller reset. Thus, every reset request generally includes a controller reset. When the host device requests a warm reset/PERST, the data storage device will perform the following operations: flush cache data to the memory device; FE ASIC accelerator/HIM reset; and PCIe MAC+PHY reset+PCIe re-initialization (Init). The warm reset/PERST is the PCIe fundamental reset. For a PERST reset operation, the host asserts a signal and de-asserts a signal during initialization when the host.

When two reset requests occur one after the other, the overlap operations can be skipped for the second reset request. In the example above, the flushing cache data to the memory device and the FE ASIC accelerator/HIM reset need not be repeated as the reset operations are duplicates for the two reset requests. Thus, for the second reset request, only the MAC+PHY reset is necessary. It should be noted, however, that if any data storage device activity occurs in between processing the first reset request and the second reset request, it is possible that reset operations cannot be combined. For example, if a host command is processed in between the first reset request and the second reset request, the second reset request will need to be processed including the flushing and FE reset. Other data storage device activity that may impact combining reset operations include garbage collection and wear leveling activities that typically occur during data storage device idle time. Background operations (BKOPS) are also typically performed during idle time.

Figure 2A:
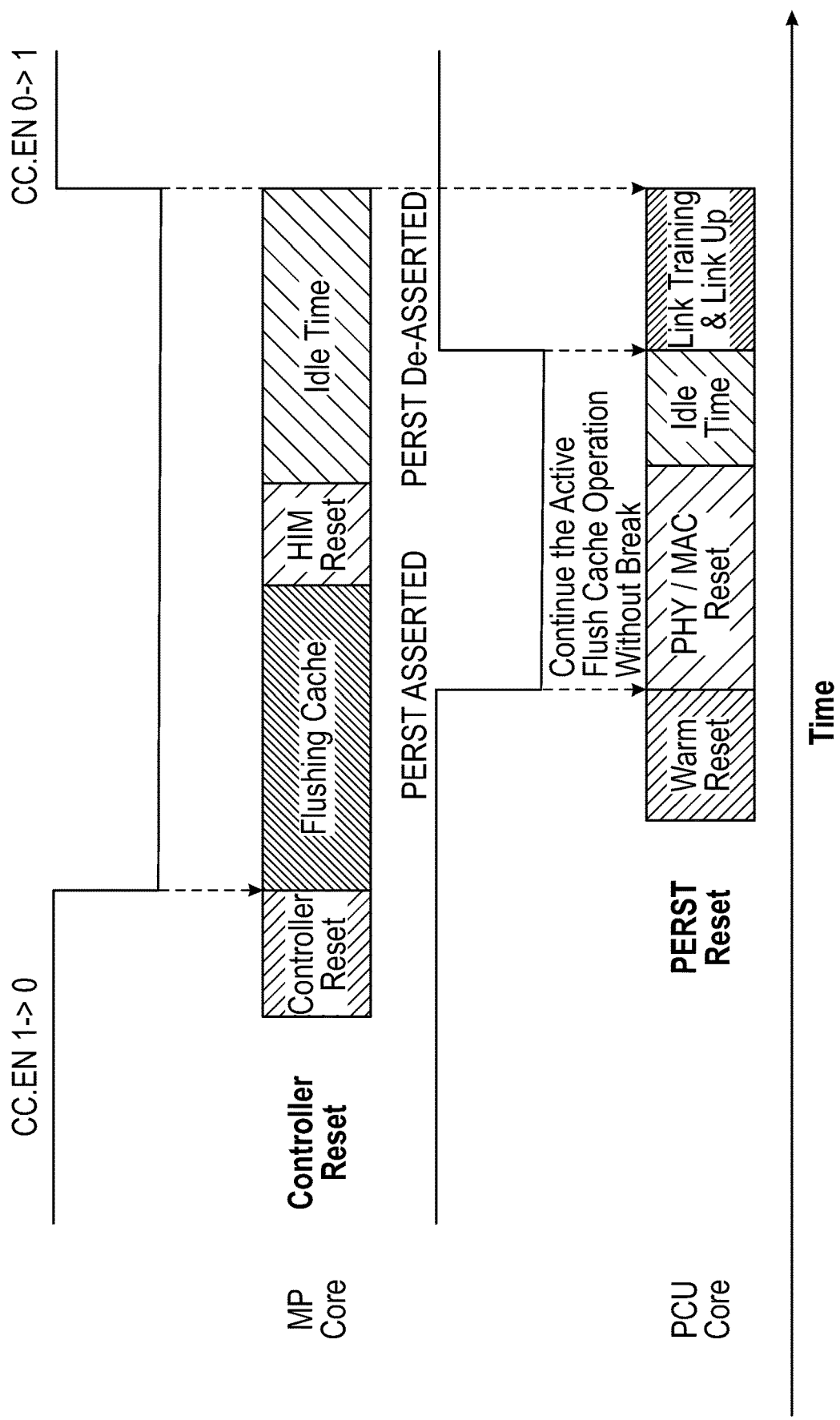
FIGS. 2A-2G are schematic illustrations of timing diagrams of reset requests according to various embodiments.

FIGS. 2A-2G are schematic illustrations of timing diagrams of reset requests according to various embodiments. FIG. 2A illustrates the scenario where a controller reset request and a PERST reset request are processed a discussed above. For the controller reset, which is received first, the reset operations begin by flushing the cache data to the memory device. While the flushing occurs, the second reset request, the PERST reset request, is received. Since the flushing of the cache data to the memory device is already occurring, there is no need to redo the flushing as no new data should be in cache at the point in time that the PERST reset request is received or beginning to be processed. Also, since the controller reset request is already processing, the HIM reset is already scheduled to occur. Therefore, there is no need to perform another HIM reset with the PERST reset. Thus, the PERST reset can begin at the PHY/MAC reset. As additionally shown in FIG. 2A, the PHY/MAC reset can begin before the flushing of cache data and the HIM reset have completed. Following the HIM reset, the controller reset request has been completed and the data storage device enters idle time for the main processor (MP). Similarly, after the PHY/MAC reset, the PERST reset request is completed, and the data storage device enters idle time for the processing unit core (PCU).

FIGS. 2B-2G are schematic illustrations showing the timing impact of overlapping reset operations. For the embodiments shown in FIGS. 2B-2G, two separate reset requests have been received with each reset request requiring the data storage device to flush cache data to the memory device and to perform a HIM reset. The first reset request additionally requires a first specific reset operation, and the second reset request requires a second specific reset operation that is different from the first specific reset operation. The first specific reset operation and the second specific reset operation are generic placeholders for reset operations. It is to be understood that the first specific reset operation and the second specific reset operation are different reset operations.

Figure 2B:
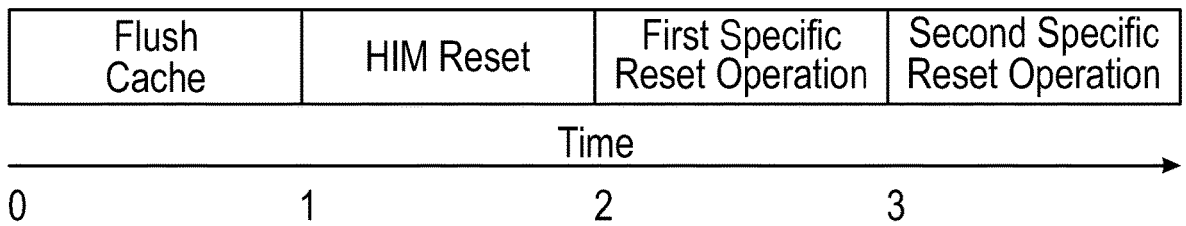

As shown in FIG. 2B, flushing cache data to the memory device begins at time 0 and is immediately followed by the HIM reset that begins at time 1. The first specific reset operation then begins following completion of the HIM reset at time 2. Since the second reset request would also involve flushing cache data to the memory device and performing a HIM reset operation, the second reset request does not need to actually perform the flushing or HIM reset as the flushing and HIM reset have already occurred. Rather, the second specific reset operation begins at time 3 after completing the first specific reset operation.

Figure 2C:
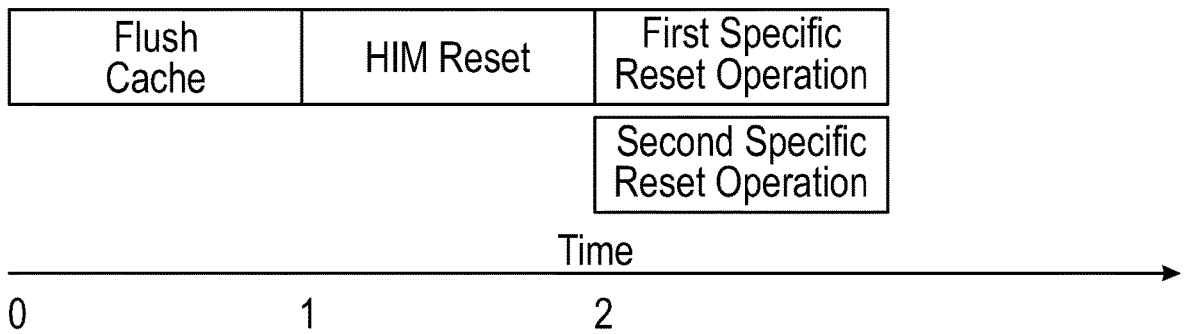

In FIG. 2C, rather than waiting for the first specific reset operation to complete, the second specific reset operation begins at time 2 (i.e., at the same time that first specific reset operation begins). It is to be noted that the second specific reset operation may begin either before or after the first reset operation begins. FIG. 2C is intended to show that the data storage device need not wait for the first specific reset operation to complete prior to beginning the second specific reset operation.

Figure 2D:
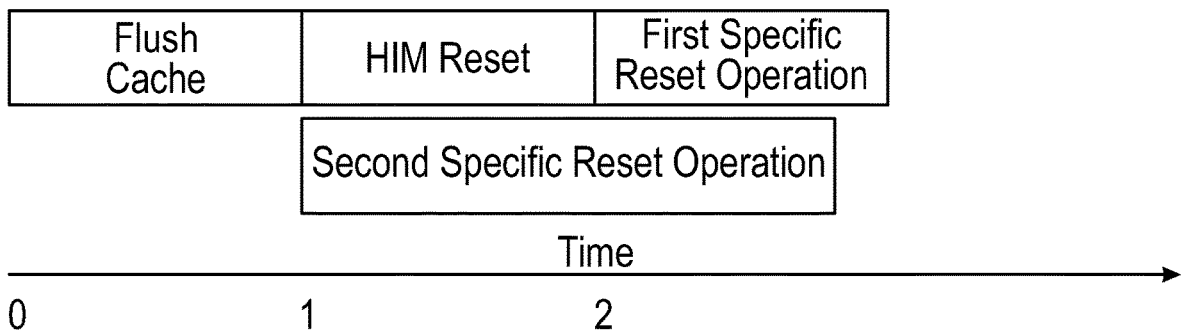

In FIG. 2D, rather than waiting for the HIM reset to complete, the second specific reset operation begins at time 1 (i.e., at the same time that HIM reset operation begins). It is to be noted that the second specific reset operation may begin either before or after the HIM reset operation begins. FIG. 2D is intended to show that the data storage device need not wait for the HIM reset operation to complete prior to beginning the second specific reset operation.

Figure 2E:
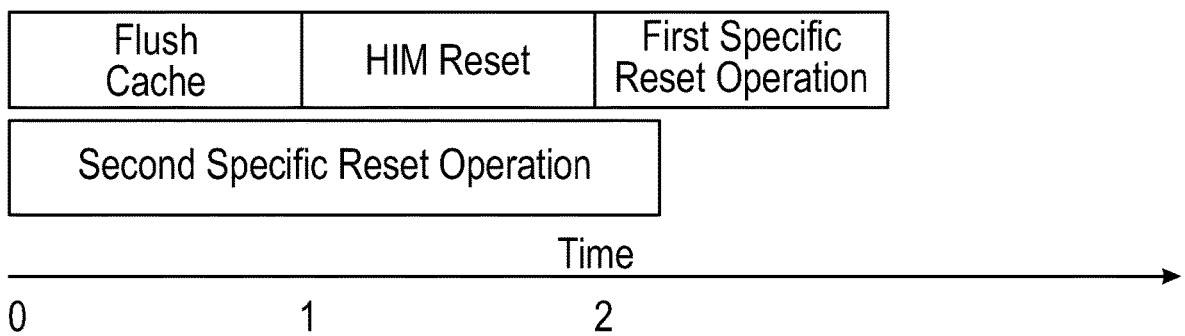

In FIG. 2E, rather than waiting for the flushing of the cache data to the memory device operation to complete, the second specific reset operation begins at time 0 (i.e., at the same time that flushing operation begins). It is to be noted that the second specific reset operation may begin before or after the flushing operation begins. FIG. 2E is intended to show that the data storage device need not wait for the flushing operation to complete prior to beginning the second specific reset operation.

Figure 2F:
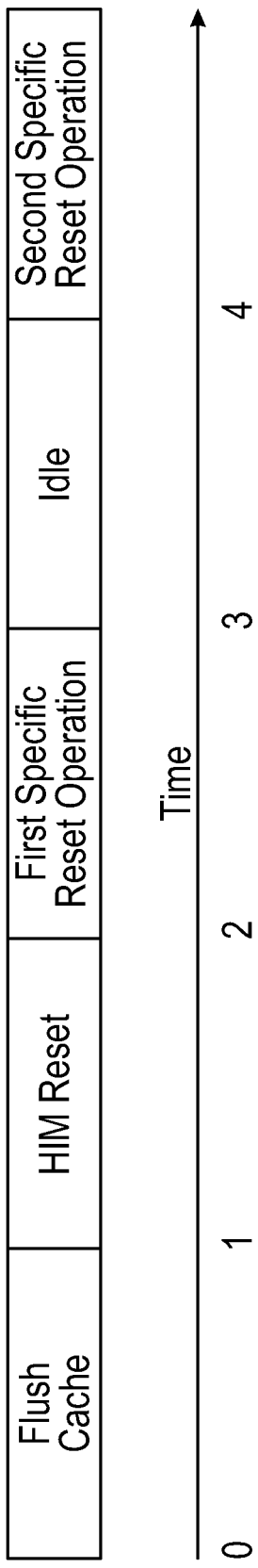
Figure 2G:
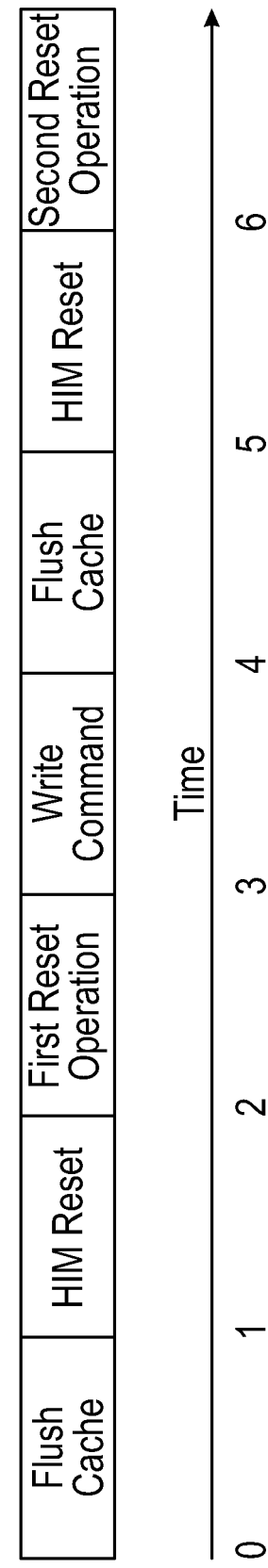

In FIG. 2F, the second reset request arrives after the first reset request has been processed. However, in between the time that the first reset request completed and the second reset request was received, the data storage device was idle. Hence, there is no need to flush cache data to the memory device or to perform a HIM reset operation. Rather, the second specific reset operation may begin at time 4 after the idle time that began at time 3. Contrasting with FIG. 2G where a write command arrives in between execution of the first reset request and receipt of the second reset request, the flushing and HIM reset must be performed for the second reset request. The flushing and HIM reset must be performed because the data storage device was not idle in between completing the first reset request and receiving the second reset request. More specifically, cache data is flushed to the memory device at time 0 followed by the HIM reset at time 1. The first specific reset operation is then performed at time 2. Thereafter, at time 3, a write command is processed. A second reset request is received and cache data is flushed to the memory device at time 4 followed by a HIM reset at time 5 and the second specific reset operation at time 6. Due to the write command, as opposed to idle time, the flushing and HIM reset associated with the second reset request must occur. It is to be understood that the other commands or operations, such as a read command, or background operations (BKOPS), wear leveling, or garbage collection, may occur in place of the write command. The point of identifying a write command occurring after processing the first reset request is to show that some operation has occurred that renders combining reset operations impossible. Furthermore, it is contemplated that the second reset request may arrive before completion of the write command. Additionally, it is to be understood that the data storage device may also have idle time both prior to and after the write command.

Figure 3:
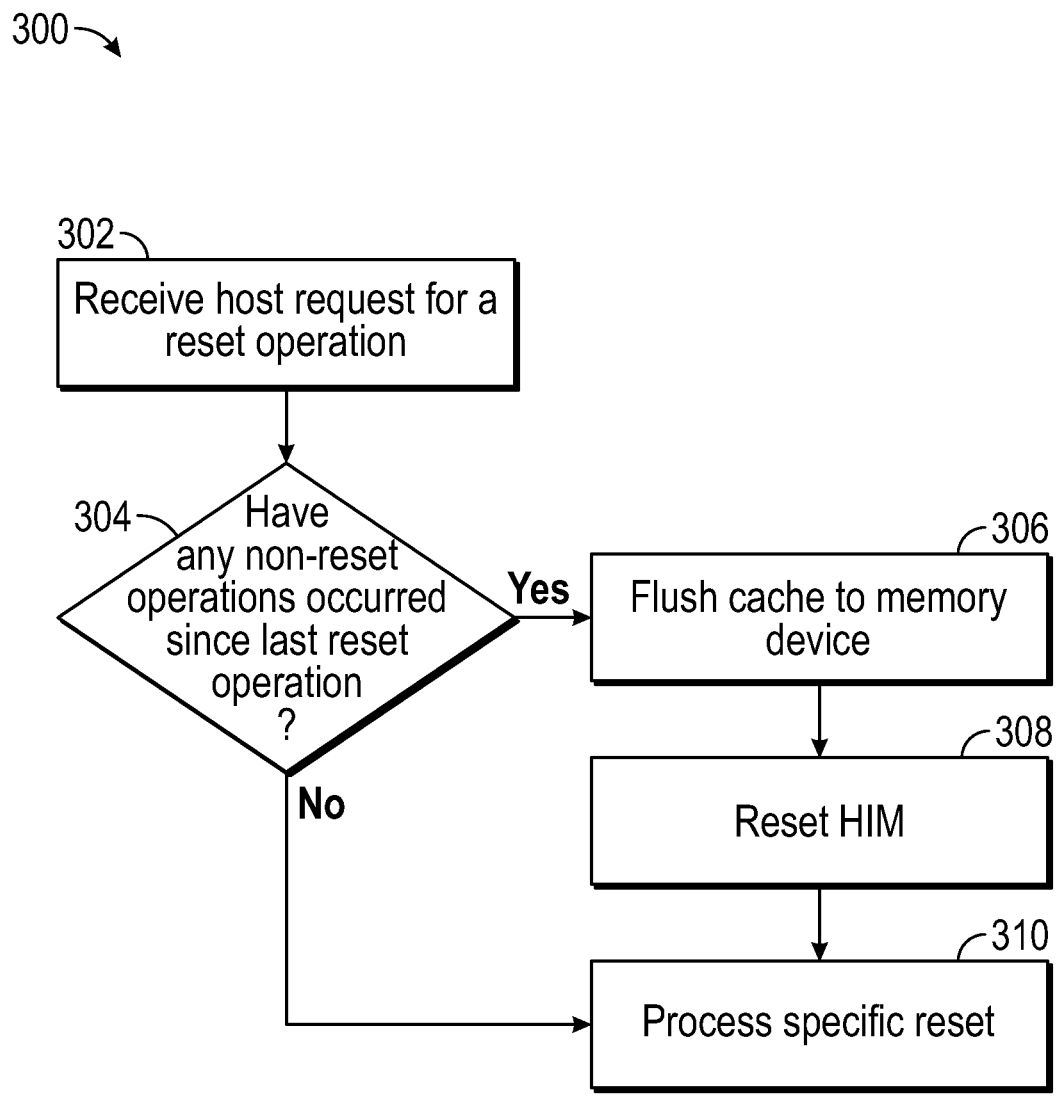
FIG. 3 is a flowchart illustrating processing of reset requests according to one embodiment.

FIG. 3 is a flowchart 300 illustrating processing of reset requests according to one embodiment. Initially, a host reset for a reset operation is received at 302. A determination is then made at 304 regarding whether any non-reset operations (e.g., a write, read, or garbage collection operation), have occurred since the last reset operation. If there have been any such non-reset operations, then the cache data is flushed to the memory device at 306, the HIM is reset at 308, and finally the specific reset operation is performed at 310. If there have not been any non-reset operations since the last reset operation (i.e., the data storage device has been idle), then the reset request may be processed by skipping the flushing of the cache data to the memory device and the HIM resent and instead, proceed directly to the specific reset request processing at 310. Other possible reset operations include NVM subsystem reset, hot reset, PCI express translation layer data link down status, function level reset (i.e., PCI reset), some firmware resets, and controller reset (i.e., CC.EN transitions from '1' to '0').

It is to be understood that flushing the cache data to the memory device and HIM reset at examples of reset operations that are likely common to all reset operations. Other reset operations are contemplated. The embodiments herein show that duplicative reset operations need not be performed when there are no non-reset operations occurring between reset requests. It is also contemplated that even though the data storage device has been idle between reset requests, the duplicative reset operations may still be performed if too much time has passed since the completion of the previous reset request processing. Additionally, while a controller reset and a PERST reset have been exemplified, it is contemplated that the disclosure herein is applicable to any reset operation including NVM subsystem reset, hot reset, PCIe transaction layer data link down status; function level reset (i.e., PCI reset), some firmware module resets, and controller reset (i.e., CC.EN transitions from '1' to '0') to name only a few.

By not performing duplicative reset operations in consecutive reset requests, or at the very least reset requests that occur without any writing of data to cache, data storage device latency is reduced and idle time is increased so that the data storage device has more time to perform background operations. The duplicative operations in reset requests permits combining reset operations so that overlapping operations are not repeated during reset internal flows. Combining reset operations reduces internal operations and improves latency while reducing the operations during the resets which help to finish the reset flow in the fastest way. The saved time can be used to perform background operations during idle time which can improve the reliability and improve the device effectiveness.

In one embodiment, a data storage device comprises: a memory device; and a controller coupled to the memory device, wherein the controller is configured to: receive a first reset request; process all operations of the first reset request; receive a second reset request; and complete less than all operations of the second reset request, wherein uncompleted operations of the second reset request are duplicates of operations of the first reset request. Prior to receiving the second reset request and after processing all operations of the first reset request, the data storage device is idle. The first reset request comprises flushing cache data to the memory device. The second reset request comprises flushing cache data to the memory device. The first reset request comprises resetting a front end (FE) application specific integrated circuit (ASIC) accelerator/host interface module (HIM). The second reset request comprises resetting the FE ASIC acceleration HIM. Operations associated with the second reset request begin processing prior to completing the first reset operation. Operations associated with the second reset request begin while flushing cache data to the memory device. Operations associated with the second reset request begin while resetting a front end (FE) application specific integrated circuit (ASIC) accelerator/host interface module (HIM).

In another embodiment, a data storage device comprises: a memory device; and a controller coupled to the memory device, wherein the controller is configured to: receive a first reset request and a second reset request, wherein the first reset request includes at least a first operation that is identical to a first operation of the second reset request, wherein the first reset request and the second reset request each include at least a second operation; perform the first operation of only one reset request of the first reset request and the second reset request; and perform the second operation for each of the first reset request and the second reset request. Each second operation is different. The first reset request includes a third operation that is identical to a third operation of the second reset request. The controller is configured to perform the third operation of only one reset request of the first reset request and the second reset request. The second operation of the second reset request begins before the second operation of the first reset request. The first reset request is a controller reset request. The second reset request if a PERST reset request. The first operation is a cache flushing operation.

In another embodiment, a data storage device comprises: memory means; a controller coupled to the memory means, wherein the controller is configured to: determine whether any data has been cached since a previous reset operation; and upon determining that no data has been cached since the previous reset operation, skip any operations of a new reset request that were performed in the previous reset request. The controller is further configured to determine whether a front end (FE) application specific integrated circuit (ASIC) accelerator/host interface module (HIM) reset has occurred in the previous reset operation. The controller is configured to determine that the data storage device was idle prior to receiving the new reset request.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a first reset request;
process all operations of the first reset request;
receive a second reset request; and
complete less than all operations of the second reset request, wherein uncompleted operations of the second reset request are duplicates of operations of the first reset request.

2. The data storage device of claim 1, wherein prior to receiving the second reset request and after processing all operations of the first reset request, the data storage device is idle.

3. The data storage device of claim 1, wherein the first reset request comprises flushing cache data to the memory device.

4. The data storage device of claim 3, wherein the second reset request comprises flushing the cache data to the memory device.

5. The data storage device of claim 1, wherein the first reset request comprises resetting a front end (FE) application specific integrated circuit (ASIC) accelerator/host interface module (HIM).

6. The data storage device of claim 5, wherein the second reset request comprises resetting the FE ASIC accelerator HIM.

7. The data storage device of claim 1, wherein operations associated with the second reset request begin processing prior to completing the first reset operation.

8. The data storage device of claim 7, wherein the operations associated with the second reset request begin while flushing cache data to the memory device.

9. The data storage device of claim 7, wherein the operations associated with the second reset request begin while resetting a front end (FE) application specific integrated circuit (ASIC) accelerator/host interface module (HIM).

10. A data storage device, comprising:
a memory device; and
a controller coupled to the memory device, wherein the controller is configured to:
receive a first reset request and a second reset request, wherein the first reset request includes at least a first operation that is identical to a first operation of the second reset request, wherein the first reset request and the second reset request each include at least a second operation;
perform the first operation of only one reset request of the first reset request and the second reset request; and
perform the second operation for each of the first reset request and the second reset request.

11. The data storage device of claim 10, wherein the second operation of the first reset request is different from the second operation of the second reset request.

12. The data storage device of claim 11, wherein the first reset request includes a third operation that is identical to a third operation of the second reset request.

13. The data storage device of claim 12, wherein the controller is configured to perform only one of the third operation of the first reset request and the third operation of the second reset request.

14. The data storage device of claim 13, wherein the second operation of the second reset request begins before the second operation of the first reset request.

15. The data storage device of claim 11, wherein the first reset request is a controller reset request.

16. The data storage device of claim 15, wherein the second reset request is a PCI Express reset (PERST) request.

17. The data storage device of claim 16, wherein the first operation is a cache flushing operation.

18. A data storage device, comprising:
memory means;
a controller coupled to the memory means, wherein the controller is configured to:
determine whether any data has been cached since a first reset operation; and
upon determining that no data has been cached since the first reset operation, skip any operations of a new reset request that were previously performed in the first reset operation.

19. The data storage device of claim 18, wherein the controller is further configured to determine whether a front end (FE) application specific integrated circuit (ASIC) accelerator/host interface module (HIM) reset has occurred in the first reset operation.

20. The data storage device of claim 19, wherein the controller is configured to determine that the data storage device was idle prior to receiving the new reset request.

\* \* \* \* \*